United States Patent
Park et al.

(10) Patent No.: US 8,422,081 B2
(45) Date of Patent: *Apr. 16, 2013

(54) IMAGE FORMING APPARATUS AND IMAGE FORMING METHOD CAPABLE OF REVISING GRAY IMAGE

(75) Inventors: In-ho Park, Suwon-si (KR); Hyun-soo Oh, Suwon-si (KR); Mi-jung Jang, Busan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,497

(22) Filed: Apr. 24, 2012

(65) Prior Publication Data

US 2012/0206747 A1    Aug. 16, 2012

Related U.S. Application Data

(63) Continuation of application No. 11/939,651, filed on Nov. 14, 2007, now Pat. No. 8,194,286.

(30) Foreign Application Priority Data

Nov. 14, 2006   (KR) ............................... 2006-112384

(51) Int. Cl.
*H04N 1/60* (2006.01)
*G06K 15/00* (2006.01)
*G03F 3/08* (2006.01)
*G06K 9/00* (2006.01)
*H04N 5/202* (2006.01)
*H04N 5/14* (2006.01)

(52) U.S. Cl.
USPC .......... 358/3.06; 358/1.9; 358/518; 358/519; 358/520; 348/254; 348/671; 382/169

(58) Field of Classification Search .................. 358/3.06, 358/1.9, 518, 519, 520; 348/254, 671; 382/169
See application file for complete search history.

(56) References Cited

U.S. PATENT DOCUMENTS

| | | | |
|---|---|---|---|
| 5,604,545 | A | 2/1997 | Chatterjee et al. |
| 6,473,521 | B1 | 10/2002 | Hino |

(Continued)

FOREIGN PATENT DOCUMENTS

| | | |
|---|---|---|
| EP | 1 118 978 | 7/2001 |
| EP | 1 292 112 | 3/2003 |

(Continued)

OTHER PUBLICATIONS

Korean Notice of Allowance mailed Nov. 3, 2011 for corresponding KR 10-2007-0078787.

(Continued)

*Primary Examiner* — Vincent Rudolph
*Assistant Examiner* — Fred Guillermety
(74) *Attorney, Agent, or Firm* — Staas & Halsey LLP (57) ABSTRACT

An apparatus includes a gray converter to convert an inputted color image to be printed into a gray conversion image and to outputs the gray conversion image a difference calculator to calculate a at least one difference value between at least one color channel image with respect to the color image and the gray conversion image; and a gray reviser to revise the gray conversion image based on the at least one difference value and to output a gray conversion image.

18 Claims, 11 Drawing Sheets
(1 of 11 Drawing Sheet(s) Filed in Color)

U.S. PATENT DOCUMENTS

| | | | |
|---|---|---|---|
| 6,567,186 B1 | 5/2003 | Jacob et al. | |
| 6,574,004 B1 | 6/2003 | Jacob et al. | |
| 6,829,061 B1 | 12/2004 | Jacob et al. | |
| 6,947,593 B2 | 9/2005 | Jia et al. | |
| 6,989,839 B2 | 1/2006 | Braun et al. | |
| 7,009,739 B1 | 3/2006 | Lin et al. | |
| 7,440,138 B2 | 10/2008 | Hofman | |
| 8,194,286 B2 * | 6/2012 | Park et al. | 358/3.06 |
| 2004/0008381 A1 | 1/2004 | Jacob et al. | |
| 2004/0080789 A1 | 4/2004 | Anderson | |
| 2004/0257378 A1 | 12/2004 | Braun et al. | |
| 2005/0068587 A1 | 3/2005 | Hayaishi | |
| 2005/0207641 A1 | 9/2005 | Bala et al. | |
| 2005/0280875 A1 | 12/2005 | Noel | |
| 2006/0072158 A1 | 4/2006 | Christie | |
| 2006/0082833 A1 | 4/2006 | Shoda et al. | |

FOREIGN PATENT DOCUMENTS

| | | |
|---|---|---|
| JP | 6-98151 | 4/1994 |
| JP | 2002-262108 | 9/2002 |
| JP | 2003-179762 | 6/2003 |
| JP | 2005-064789 | 3/2005 |
| KR | 2003-0022011 | 3/2003 |
| KR | 10-2005-0104046 | 11/2005 |

OTHER PUBLICATIONS

Communication pursuant to Article 94(3) EPC, mailed Mar. 1, 2011, in corresponding European Application No. 07120484.6.

Lawler, Brian P.: "Black and White from color—the best way is not always the easy way"; 4 pgs; retrieived from http://www.imaging-resource.com/TTPS/LAWLER/CLR2BW.pdf © 1998.

Grundland et al., "The Decolorize Algorithm for Contrast Enhancing Color to Grayscale Conversion," Technical Report No. 649, University of Cambridge, Computer Laboratory, Oct. 2005.

Search Report issued in European Patent Application No. 07120484.6 on May 11, 2009.

U.S. Office Action mailed Jun. 13, 2011 in related U.S. Appl. No. 11/939,651.

U.S. Notice of Allowance mailed Jan. 20, 2012 in related U.S. Appl. No. 11/939,651.

U.S. Appl. No. 11/939,651, filed Nov. 14, 2007, In-ho Park et al., Samsung Electronics Co., Ltd.

* cited by examiner

COLOR IMAGE

FIG. 6B

GRAY IMAGE(RELATED ART)

FIG. 6C

GRAY IMAGE(PRESENT INVENTION)

FIG. 7

IMAGE FORMING APPARATUS AND IMAGE FORMING METHOD CAPABLE OF REVISING GRAY IMAGE

CROSS-REFERENCE TO RELATED APPLICATIONS

This application is a continuation of U.S. Ser. No. 11/939,651, filed Nov. 14, 2007 now U.S. Pat. No. 8,194,286, the disclosure of which is incorporated herein in its entirety by reference. This application claims the priority benefit of Korean Patent Application No. 2006-112384, filed Nov. 14, 2006 in the Korean Intellectual Property Office, the disclosure of which is incorporated herein by reference.

BACKGROUND OF THE INVENTION

1. Field of the Invention

Aspects of one or more embodiments relate to an image forming apparatus and an image forming method and, more particularly, to an image forming apparatus that retains properties of a color image and generates a gray image with high readability and an image forming method thereof.

2. Related Art

Image forming apparatuses now commonly print in color; similarly, virtually all displays now display images and documents in color. If the images and/or documents are printed by a black-and-white image forming apparatus, various colors of the documents (and/or images) are first converted into various shades of gray.

Figure 1:
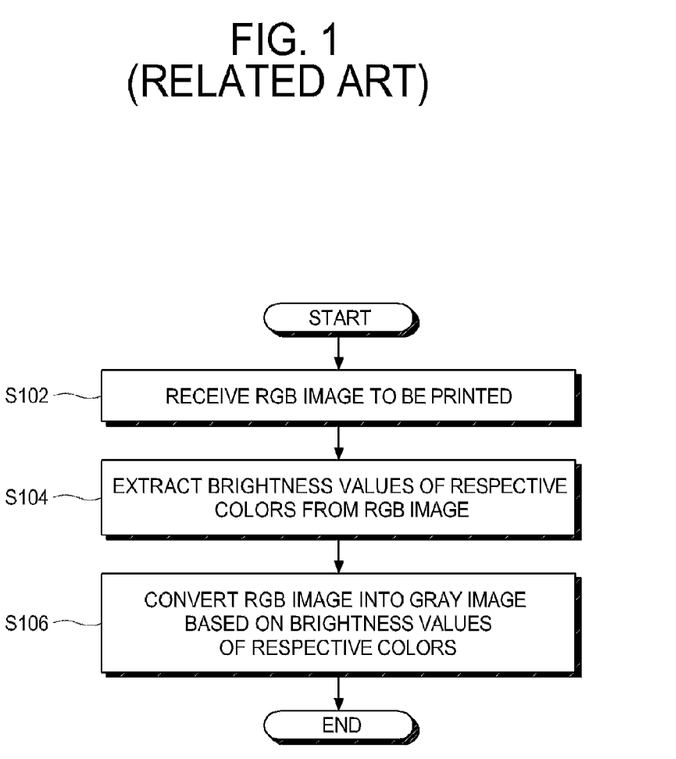
FIG. 1 is a flowchart of a conventional image forming method to convert an RGB image into a gray image.

FIG. 1 is a flowchart of a conventional image forming method to convert an RGB image into a gray image. The conventional image forming method includes receiving an RGB image to be printed at block S102, extracting brightness values of respective colors in the RGB image at block S104 and converting the RGB image into the gray image based on the extracted brightness values of the respective colors at block S106 by Formula (0):

$$\text{Gray image} = 0.2989 \times R + 0.5890 \times G + 0.1140 \times B$$

Here, R is a variable corresponding to the value of a red color channel of the RGB image, G is a variable corresponding to the value of a green color channel of the RGB color image, and B is a variable corresponding to the value of a blue color channel of the RGB color image. If the color image is converted into the gray image by multiplying the brightness values alone, a hue and a saturation of the respective colors of the color image are not distinguished, and colors having similar hue and saturation will have the same brightness. The color image converted into the gray image will not retain the properties of the color image, thereby lowering readability of the gray image.

SUMMARY OF THE INVENTION

Aspects of one or more embodiments provide an image forming apparatus that keeps properties of a color image and generates a gray image with high readability and an image forming method thereof.

Additional aspects of one or more embodiments provide an image forming apparatus that keeps a gray density and generates a gray image with high readability and an image forming method thereof.

According to an aspect of one or more embodiments, an image forming apparatus is provided comprising a gray converter to convert an inputted color image to be printed into a gray conversion image and to output the gray conversion image; a difference calculator to calculate at least one a difference value between at least one color channel image with respect to the color image and the gray conversion image; and a gray reviser to revise the gray conversion image based on the at least one difference value and to output a revised gray conversion image.

According to another aspect of the invention, the color image comprises an RGB image.

According to another aspect of the invention, the gray converter converts the RGB image into the gray conversion image based on brightness values of respective colors of the color image.

According to another aspect of the invention, the difference calculator calculates the difference value between an R color channel image, a G color channel image and/or a B color channel image with respect to the color image and the gray conversion image.

According to another aspect of the invention, the gray reviser revises the gray conversion image by multiplying each of the at least one difference values by different weight variables and then summing the weighted difference values.

According to another aspect of the invention, the gray reviser revises the gray conversion image by multiplying the sum of the weighted difference value by a turning coefficient in order to retain a gray density.

According to another aspect of the invention, the gray converter converts the color image into the gray conversion image based on a brightness value of an R color channel image with respect to the color image.

According to another aspect of the invention, the difference calculator calculates the difference value between a G color channel image and/or a B color channel image with respect to the color image and the gray conversion image.

According to an aspect of the invention, the gray reviser revises the gray conversion image by multiplying each of the at least one difference values by different weight variables and then summing the weighted difference values.

According to an aspect of the invention, the gray reviser revises the gray conversion image by multiplying a G difference value by a weight variable having a value 0.5890, multiplying a B difference value by a weight variable having a value 0.1140, and then summing the weighted difference values.

According to another aspect of the invention, the turning coefficient is set as a default value ranging from 1.05 to 1.2.

According to another aspect of the invention, the image forming apparatus further comprises a user interface; and a controller to set the turning coefficient with respect to the color image through the user interface and to display the revised gray conversion image revised by the turning coefficient.

According to another aspect of one or more embodiments, an image forming method is provided comprising: receiving a color image to be printed and converting the color image into a gray conversion image to be outputted; calculating a difference value between the gray conversion image and a color channel image with respect to the color image; revising the gray conversion image based on the at least one difference value; and outputting the revised gray conversion image.

According to an aspect of the invention, the converting of the color image into the gray conversion image to be outputted comprises converting the RGB image into the revised gray conversion image based on brightness values of respective colors of the color image.

According to an aspect of the invention, the calculating of the at least one difference value comprises calculating the difference value between an R color channel image, a G color channel image, and/or a B color channel image with respect to the color image and the gray conversion image.

According to another aspect of the invention, the revising of the gray conversion image comprises revising the gray conversion image by multiplying each of the at least one difference values by different weight variables and then summing the weighted difference values.

According to another aspect of the invention, the revising of the gray conversion image comprises revising the gray conversion image by multiplying the sum of the weighted difference value by a turning coefficient in order to retain a gray density.

According to another aspect of the invention, the converting of the color image into the gray conversion image to be outputted comprises converting the color image into the gray conversion image based on a brightness value of an R color channel image of the color image.

According to another aspect of the invention, the calculating of the at least one difference value comprises calculating the difference value between a G color channel image and/or a B color channel image with respect to the color image and the gray conversion image.

According to another aspect of the invention, the revising of the gray conversion image comprises revising the gray conversion image by multiplying each of the at least one difference values by different weight variables and then summing the weighted difference values.

According to another aspect of the invention, the revising of the gray conversion image comprises revising the gray conversion image by multiplying a G difference value by a weight variable having a value 0.5890, multiplying a B difference value by a weight variable having a value 0.1140, and then summing the two weighted difference values.

According to another aspect of the invention, the revising of the gray conversion image comprises revising the gray conversion image by multiplying the sum of the weighted difference values by a turning coefficient in order to retain a gray density.

According to another aspect of the invention, the method further comprises setting the turning coefficient with respect to the color images through a user interface and displaying the gray conversion image revised by the turning coefficient.

According to another aspect of one or more embodiments, a computer readable medium is provided comprising instructions encoded thereon that, when executed by a processor, cause the processor to perform a method comprising: receiving a color image; converting the color image into a gray conversion image; calculating at least one difference value between the gray conversion image and at least one color channel of the color image; revising the gray conversion image based on the at least one difference value; and outputting the revised gray conversion image.

According to another aspect of one or more embodiments, the calculating of the at least one difference value comprises calculating the difference value between an R (red) color channel image, a G (green) color channel image and/or a B (blue) color channel image with respect to the color image and the gray conversion image.

According to another aspect of one or more embodiments, the revising of the gray conversion image comprises revising the gray conversion image by multiplying each of the respective difference values by different weight variables and then summing the weighted difference values.

According to another aspect of one or more embodiments, the color image is an RGB (red-green-blue) image.

According to another aspect of one or more embodiments, the converting of the color image into the gray conversion image comprises converting the color image into the gray conversion image based on a brightness value of an R color channel image.

According to another aspect of one or more embodiments, the calculating of the at least one difference value comprises calculating the difference value between a G color channel image and/or a B color channel image with respect to the color image and the gray conversion image.

According to another aspect of one or more embodiments, According to another aspect of one or more embodiments, an apparatus is provided comprising: an image receiving unit to receive a color image; a gray converter to convert the color image into a converted gray conversion image based on at least one brightness value of colors in the color image; a difference calculator to calculate at least one difference value between at least one color channel image of the color image and the gray conversion image; a gray reviser to revise the gray conversion image based on the least one difference value; and an image outputting unit to output the gray conversion value revised by the gray reviser.

Additional aspects and/or advantages of the invention will be set forth in part in the description which follows and, in part, will be obvious from the description, or may be learned by practice of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects and advantages of the invention will become apparent and more readily appreciated from the following description of the embodiments, taken in conjunction with the accompany drawings of which.

DETAILED DESCRIPTION OF THE EMBODIMENTS

Reference will now be made in detail to one or more embodiments, examples of which are illustrated in the accompanying drawings, wherein like reference numerals refer to the like elements throughout. Embodiments are described below in order to explain the invention by referring to the figures.

Figure 2:
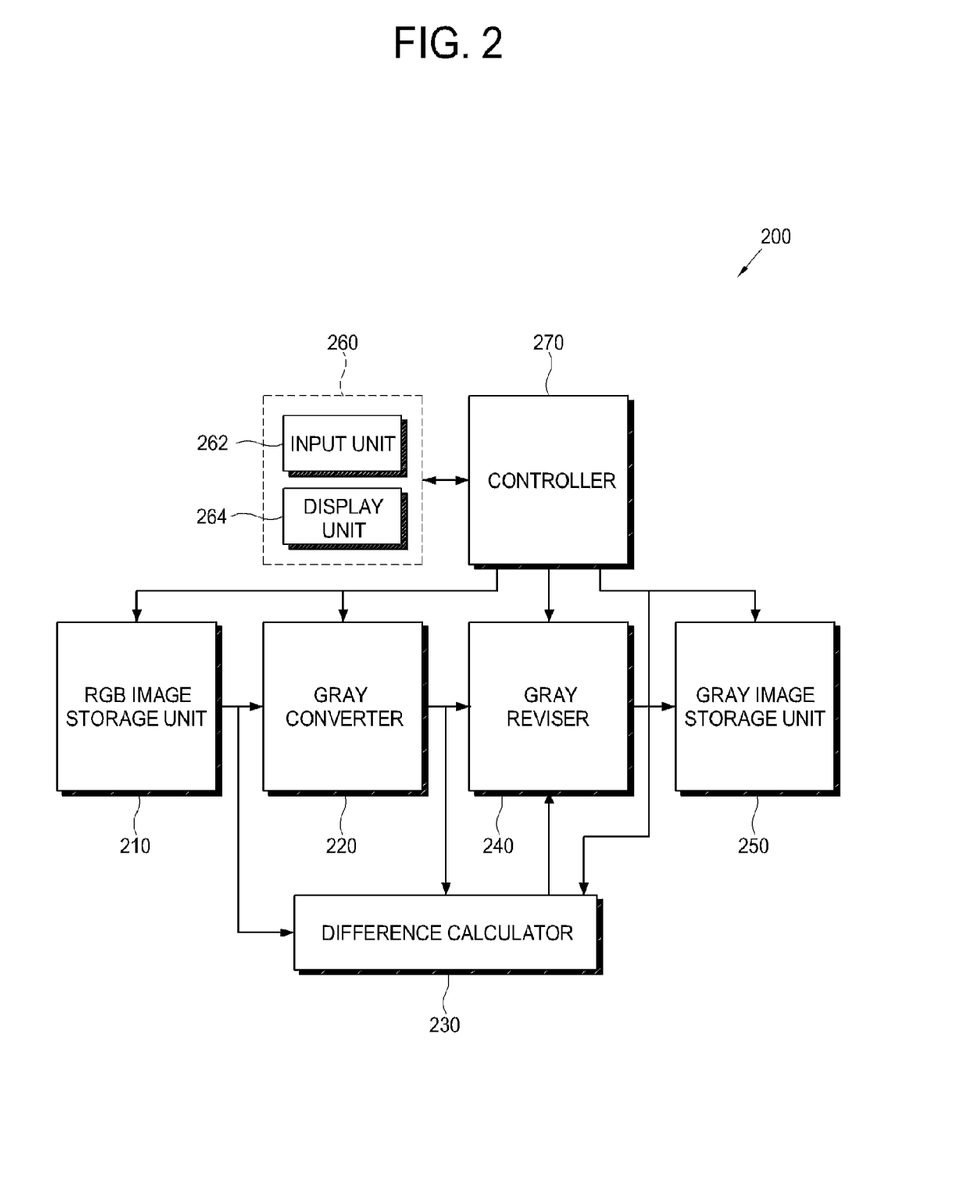
FIG. 2 is a block diagram of an image forming apparatus according to an embodiment.

FIG. 2 is a block diagram of an image forming apparatus according to an embodiment. An image forming apparatus 200 in FIG. 2 may be provided as a computer, a printer, a photocopier, a facsimile machine, or multi-function device. The image forming apparatus 200 converts a color image to be printed into a gray image and prints the gray image. As shown in FIG. 2, the image forming apparatus 200 includes an RGB image storage unit 210, a gray converter 220, a difference calculator 230, a gray reviser 240, a gray conversion image storage unit 250, a user interface (UI) 260 and a controller 270. The image forming apparatus 200 according to other aspects of the invention may include additional components or may omit one of more of the above components or may combine one or more of the above components. For example, an image forming apparatus according to other aspects of one or more embodiments may omit the user interface 260.

The RGB image storage unit 210 stores at least one color image to be printed. The color image may be input by a color scanner or generated by a program such as Adobe Photoshop. The color image may be a RGB image, a CYMK image, or other type of color image. The gray converter 220 receives a color image (such as an RGB image) and converts the color image into a gray conversion image to be outputted. The gray converter 220 converts the color image into the gray conversion image based on brightness values of the respective colors of the color image. The gray conversion image is typically expressed with 256 levels or 512 levels, though any number of levels may be used. The gray levels of the gray conversion image have different saturations when printed.

The difference calculator 230 calculates a difference value between the gray conversion image and a color channel image with respect to the color image. The difference calculator 230 calculates the difference value between, for example, an R (red) channel image, a G (green) channel image and/or a B (blue) channel image with respect to the color image and the gray conversion image.

The gray reviser 240 revises the gray conversion image by the calculated difference values. The gray reviser 240 revises the gray conversion image by multiplying the calculated respective difference values by different weight values, summing the weighted difference values, and multiplying a turning coefficient by the sum of the weighted difference values to retain a gray density.

The gray image storage unit 250 stores a gray image outputted from the gray reviser 240. If the image forming apparatus 200 is embodied as a printing apparatus, the stored gray image may be printed by a printing apparatus (not shown). If the image forming apparatus 200 is embodied as a computer, the stored gray image may be transmitted to a printing apparatus through an interface (not shown).

The UI 260 includes an input unit 262 and a display unit 264 to interface with a user. The input unit 262 may include a plurality of keys to set or select various functions of the image forming apparatus 200 by a user. The input unit 262 may be a keyboard, a mouse, a touchpad, a microphone, or other device capable of receiving input from the user. The display unit 264 displays an operation state of the image forming apparatus 200 to be provided to the user, according to a control of the controller 260. The components of the user interface 260 may be housed separately from the image forming apparatus 200.

The controller 270 controls the image forming apparatus 200 as a whole, according to a control program, while the image forming apparatus 200 receives power. The controller 270 sets a turning coefficient A of the color images to be printed according to a setting command inputted by the input unit 262 and displays the gray image that is revised by the turning coefficient A on the display unit 264.

Figure 3:
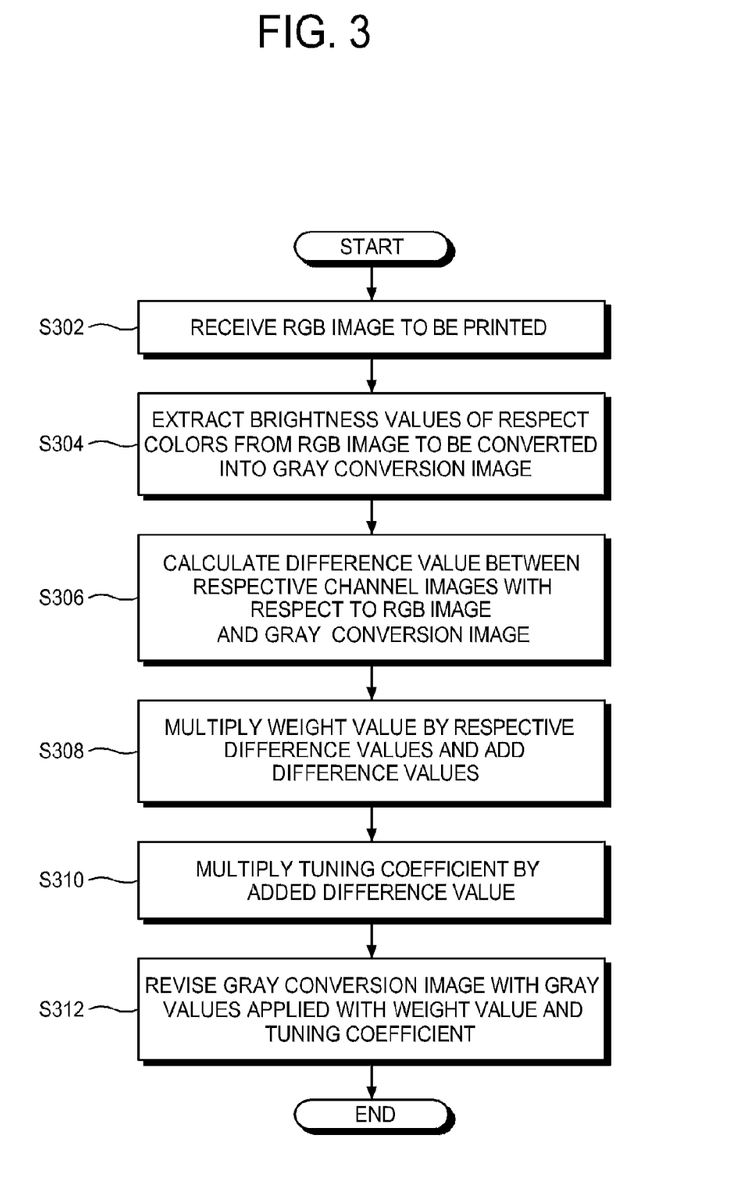
FIG. 3 is a flowchart of an image forming method according to an embodiment.

FIG. 3 is a flowchart of an image forming technique according to an embodiment. A technique of revising the gray conversion image will be described with reference to FIGS. 2 and 3. When a user inputs a printing command to the image forming apparatus 200 through the input unit 262, the controller 270 controls to input an RGB image to be printed, to the gray converter 220 from the RGB image storage unit 210, at block S302.

The gray converter 220 extracts the brightness values of the respective colors from the inputted RGB image and converts the RGB image into the gray conversion image based on the extracted brightness values at block S304. The gray conversion image may be converted by extracting the brightness values in a color coordinate system of YCC, L*a*b, or Ycbcr of the color image. The gray conversion image described in connection with the example embodiment shown in FIG. 3 is referred to as tmp_Gray.

The difference calculator 230 calculates the difference value between the R channel image, the G channel image or the B channel image with respect to the RGB image and the gray conversion image at block S306. The R channel image, the G channel image, and the B channel image refer to a Red_channel, a Green_channel, and a Blue_channel, respectively. The difference values diff_R, diff_G and diff_B of the respective color channels may be calculated using Formula:

$$\mathrm{diff\_}R = Red\_channel - tmp\_Gray$$

$$\mathrm{diff\_}G = Green\_channel - tmp\_Gray$$

$$\mathrm{diff\_}B = Blue\_channel - tmp\_Gray$$

At block S308 the gray reviser 240 multiplies the respective difference values calculated by the difference calculator 230 by different weight variables and sums the results. The gray reviser 240 multiplies diff_R by a weight variable r, diff_G by a weight variable g, and diff_B by a weight variable b and sums the results. The respective difference values are multiplied with the weight variables r, g, and b respectively to retain the inherent properties of the color image and the gradations of the gray image.

At block S310, the gray reviser 240 multiplies the sum of the weighted difference values by the turning coefficient A to keep the gray density. The gray reviser 240 revises the gray conversion image with gray values applied with the weight variables and the turning coefficient A at block S312. The revised gray image correct_Gray may be represented by Formula (2):

$$\mathrm{correct\_Gray} = tmp\_Gray + A \times (r \times \mathrm{diff\_}R + g \times \mathrm{diff\_}G + b \times \mathrm{diff\_}B)$$

Figure 4:
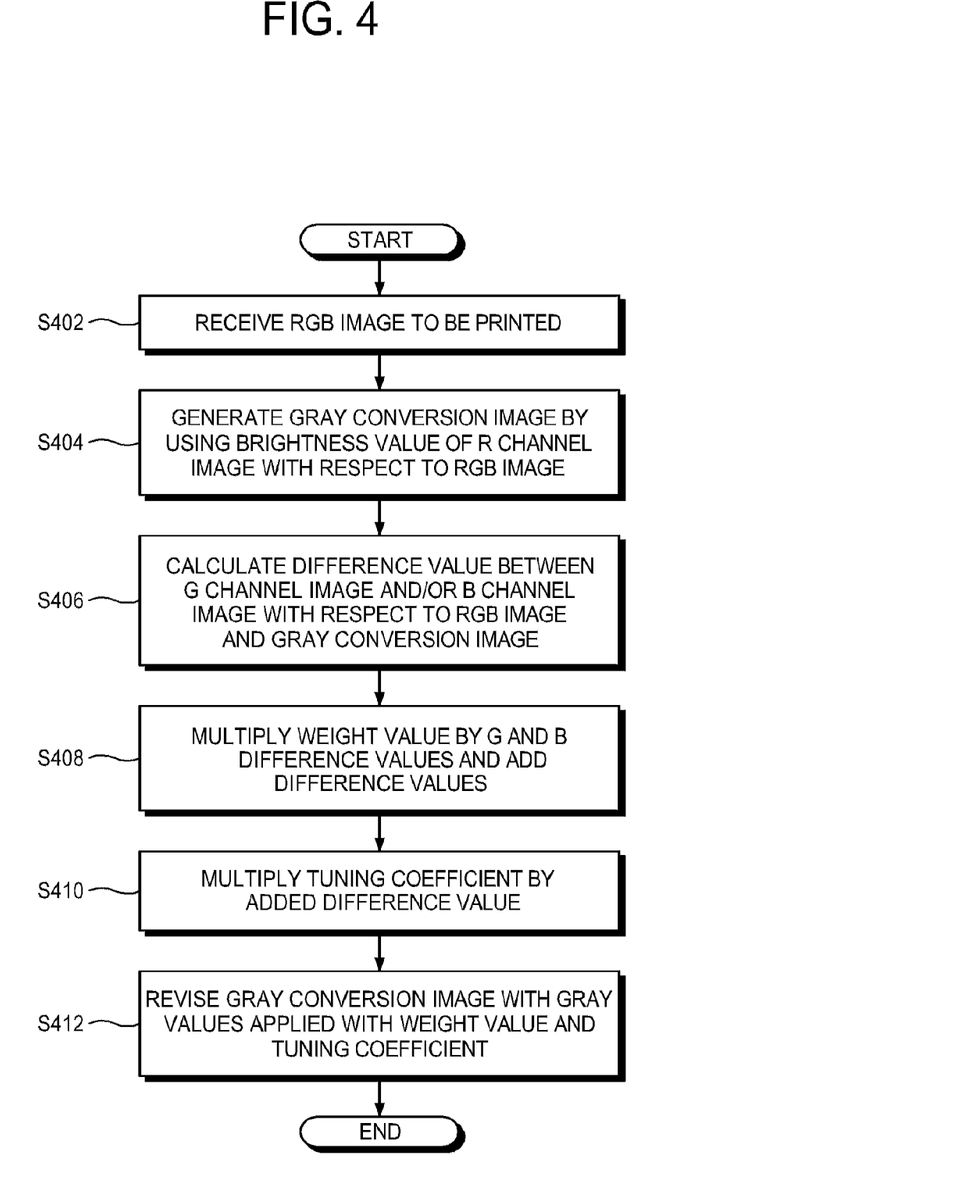
FIG. 4 is a flowchart of an image forming method according to another embodiment.

FIG. 4 is a flowchart of an image forming technique according to another embodiment. While the weight values r, g, and b are calculated and applied in Formula (2), the image forming technique illustrated in FIG. 4 employs a simpler calculating process than that illustrated in FIG. 3 and retains gradations of the gray conversion image. A technique of revising the gray image according to another embodiment will be described with reference to FIGS. 2 and 4.

When the user inputs a printing command to the image forming apparatus 200 through the input unit 262, the controller 270 controls to input a RGB image to be printed to the gray converter 220 from the RGB image storage unit 210, at block S402.

The gray converter 220 receives the RGB image and generates a gray conversion image based on a brightness value of an R channel image of the RGB image at block S404. The gray converter 220 is assigned with the R channel to retain a gray density in an order of black, blue, red, magenta, green, cyan, yellow and white on the basis of the National Television System Committee (NTSC) method when applying a turning coefficient A, though other orders may be used as well. The gray conversion image described in connection with the example embodiment shown in FIG. 4 is referred to as tmp_Gray2.

The difference calculator 230 calculates the difference value between a G channel image or a B channel image with respect to the RGB image and the gray conversion image at block S406. A G channel difference value diff_G2 and a B channel difference value diff_B2 may be calculated using Formula (3):

$$diff\_G2 = Green\_channel - tmp\_Gray2$$

$$diff\_B2 = Blue\_channel - tmp\_Gray2$$

The gray reviser 240 multiplies the respective difference values calculated by the difference calculator 230 by different weight variables and sums the results at block S408. The gray reviser 240 multiplies a weight variable g2 by diff_G2 and a weight variable b2 by diff_B2, then adds the results together. While any values for the weight variables g2 and b2 may be used, the values of the weight variables g2 and b2 may be chosen to be 0.5890 and 0.1140, respectively. Those two values are used in the NTSC transformation and are selected by human visual reactions.

The gray reviser 240 multiplies the sum of the weighted difference values by the turning coefficient A to retain the gray density at block S410. The gray reviser 240 revises the gray conversion image with the gray values applied with the weight values and the turning coefficient at block S412. The revised gray image may be represented by Formula (4):

$$correct\_Gray2 = tmp\_Gray2 + A \times (0.5890 \times diff\_G2 + 0.1140 \times diff\_B2)$$

If the gray conversion image is generated using the brightness value of the G channel image of the RGB image, green color becomes darker than red color in the gray density order. If the gray conversion image is generated using the brightness value of the B channel image of the RGB image, blue color becomes relatively brighter. The brighter blue is a result as much from a distribution of the brightness of the color channels converted into the gray conversion image to other color channels as the brighter blue is a result of the weight values.

The turning coefficient A determines the extent to which the properties of the color image are retained by applying the color difference values to the gray conversion image. If the turning coefficient A is 1, the transformation is the same as the NTSC standard. If the turning coefficient is larger than 1, the properties of the color image are retained. A technique of setting the turning coefficient A will be described.

Figure 5A:
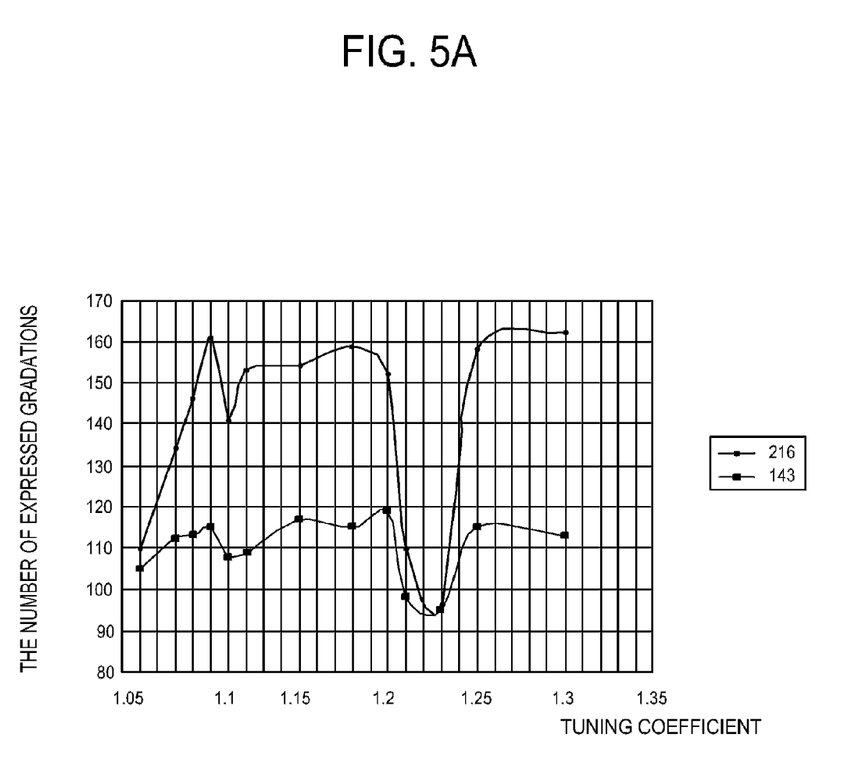
FIGS. 5A-5C are graphs which illustrate the number of gradations expressed by a variation of a turning coefficient A according to an embodiment.
Figure 5B:
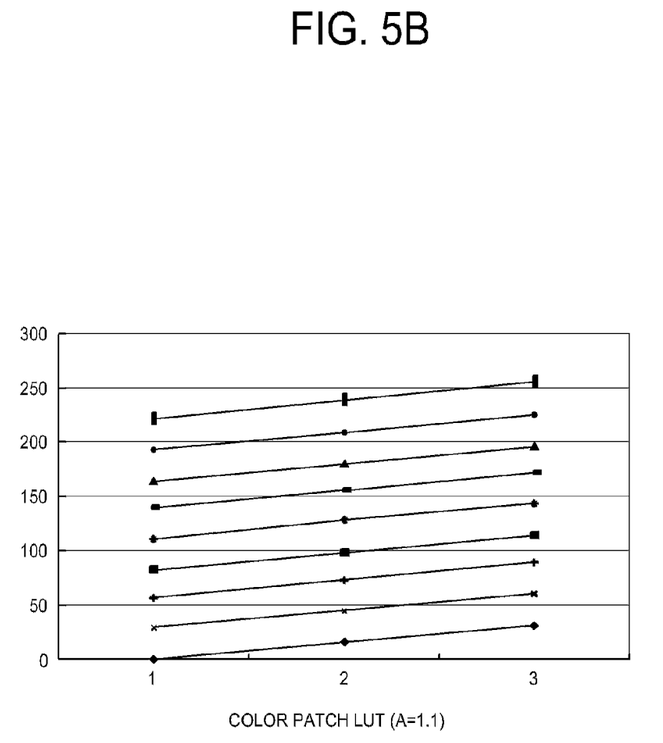
Figure 5C:
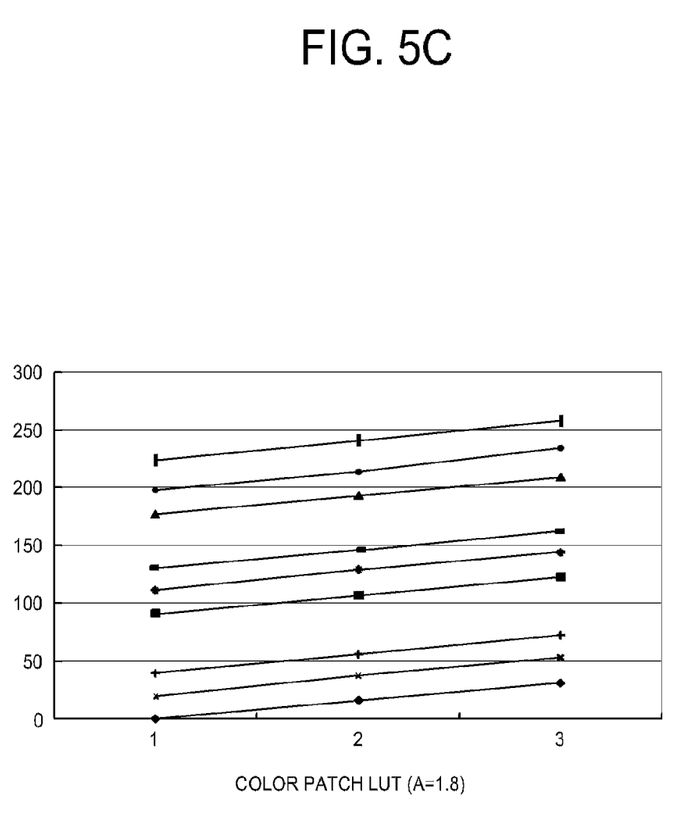

First, a fixed turning coefficient A will be described. FIG. 5A illustrates a graph demonstrating the number of expressed gradations according to a variation of the turning coefficient A. One hundred and forty-three color patches and 216 color patches of Microsoft PowerPoint are used to ensure a visual test and an objectivity in setting the turning coefficient A. FIGS. 5B and 5C illustrate values obtained by converting a color patch of "3×3×3" into a gray patch under the condition that turning coefficients A are 1.1 and 1.8, respectively. If the turning coefficient A is 1.8 or higher, the gradations become mashed. Visual tests show that the certain gradation is saturated. Thus, the turning coefficient A may be set as a default value ranging from 1.05 to 1.2.

Figure 6A:
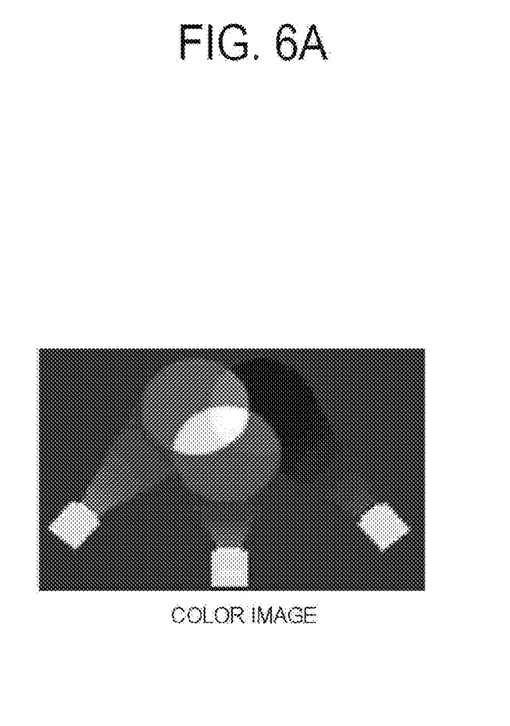
FIGS. 6A-6C illustrate a comparison of readability of the gray image according to an embodiment, with a conventional gray image.
Figure 6B:
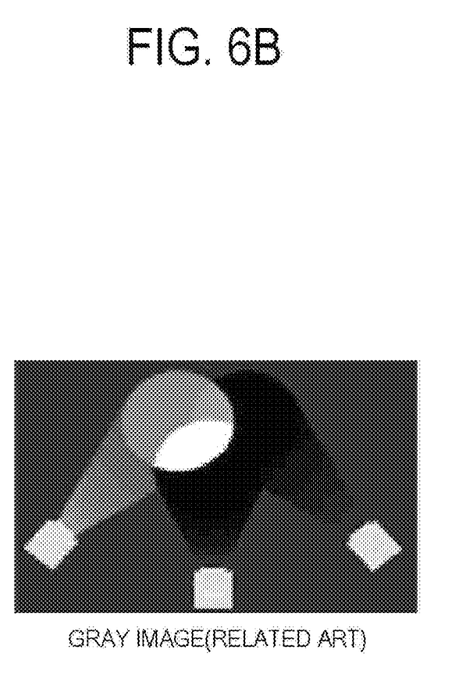
Figure 6C:
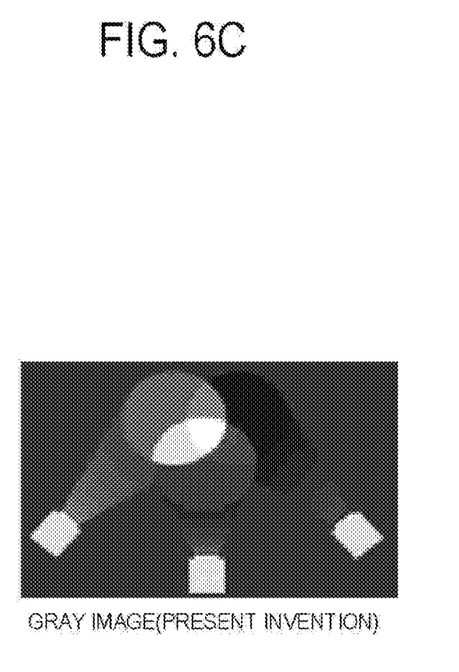

FIGS. 6A-6C illustrate the readability of the gray image according to an embodiment, as compared to the conventional gray image. FIG. 6A refers to the color image to be printed, while FIG. 6B is the gray image according to the conventional conversion method. FIG. 6C illustrates the gray image when the turning coefficient A is set as 1.1. As shown in FIGS. 6A-6C, the gray image according to aspects of one or more embodiments retains the properties of the color image better than that according to the conventional conversion method, thereby improving readability.

Figure 7:
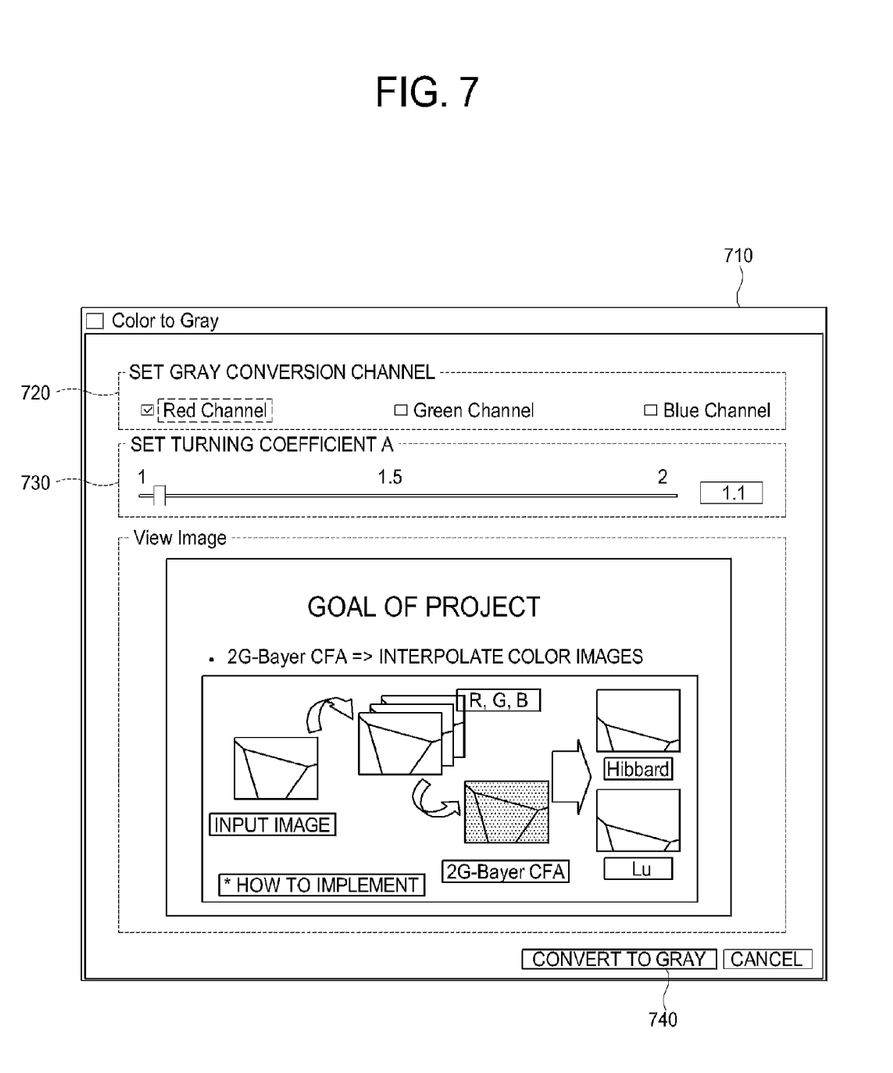
FIG. 7 illustrates an example of a setting window to set the turning coefficient A according to an embodiment.

A technique of achieving the desired gray image using a setting window displayed on the display unit 264 will be described. As the display unit 264 has a limitation in retaining the properties of the color image uniformly when converting a color image having 16 million colors of three hues into the gray conversion image, the user may be required to confirm the gray image having the desired properties before the color image is printed. FIG. 7 illustrates an example of the setting window to set the turning coefficient A according to an embodiment.

The controller 270 controls the display unit 264 to display a setting window 710 on the display unit 264 to set the turning coefficient A. The user selects the color channel displayed on a gray conversion channel setting region 720 through the input unit 262. The gray converter 220 converts the selected color channel image into the gray conversion image based on the brightness value. The user adjusts the turning coefficient A displayed on a turning coefficient setting region 730 through the input unit 262 and clicks a gray conversion button 740. The gray image generated from the color image to be printed is displayed on the display unit 264.

As described above, aspects of one or more embodiments provide a gray image that keeps properties of a color image and has high readability. Also, aspects of one or more embodiments generate a gray image that keeps a gray density depending on colors and has high readability. Further, aspects of one or more embodiments provide a gray image that is generated by selecting a reference channel and a turning coefficient by a user.

Color conversion techniques according to aspects of one or more embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like; and a computer data signal embodied in a carrier wave comprising a compression source code segment and an encryption source code segment (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of the above-described embodiments.

While there have been illustrated and described what are considered to be embodiments, it will be understood by those skilled in the art and as technology develops that various changes and modifications, may be made, and equivalents may be substituted for elements thereof without departing from the true scope of one or more embodiments. Many modifications, permutations, additions and sub-combinations may be made to adapt the teachings of one or more embodiments to a particular situation without departing from the scope thereof. For example, the techniques described above in connection with FIG. 3 and FIG. 4 may be adapted for use with other color models, such as the CYMK (cyan, yellow, magenta, black) color model or the HSV (hue, saturation, value) color model. Aspects of one or more embodiments can be incorporated into any apparatus, such as a scanner, a digital camera, a notebook computer, a mobile phone, or any apparatus capable of manipulating images. Similarly, although the weight variables for the various different values described above all have different values, two or more of the weight variables may have the same value. Accordingly, it is intended, therefore, that the invention not be limited to the various example embodiments disclosed, but that the invention includes all embodiments falling within the scope of the appended claims.

What is claimed is:

1. An image converting method, comprising:
converting a color image into a gray image based on brightness values of respective colors of the color image;
calculating at least one difference value between at least one color channel image of the color image and the gray image; and
correcting the converted gray image using the difference value between the gray image and each color channel image with respect to the color image.

2. The method according to claim 1, wherein the color image comprises a RGB (Red-Green-Blue) image.

3. The method according to claim 2, wherein the calculating the difference value comprises calculating the difference value between a R (red) color channel image, a G (green) color channel image, and/or a B (blue) color channel image with respect to the color image and the gray image.

4. The method according to claim 2, wherein the correcting the converted gray image comprises multiplying each of the at least one difference values by different weight variables and then summing the weighted difference values.

5. The method according to claim 4, further comprising displaying a setting window comprising a channel setting region to select at least one color channel image.

6. The method according to claim 5, wherein the setting window further comprises a setting region to set a turning coefficient by a user, and
wherein the correcting the converted gray image comprises multiplying the sum of the weighted difference values by the turning coefficient in order to retain a gray density.

7. The method according to claim 6, further comprising displaying the corrected gray image revised by the turning coefficient.

8. The method according to claim 2, wherein the converting of the color image into the gray image comprises converting the color image into the gray image based on a brightness value of a R color channel image of the color image.

9. The method according to claim 2, further comprising: outputting the corrected gray image.

10. An image forming apparatus, comprising:
a processor for performing the functions of:
a gray converter to convert a color image into a gray image based on brightness values of respective colors of the color image;
a difference calculator to calculate at least one difference value between at least one color channel image of the color image and the gray image; and
a gray reviser to correct the converted gray image using the difference value between the gray image and each color channel image with respect to the color image.

11. The image forming apparatus according to claim 10, wherein the color image comprises a RGB image.

12. The image forming apparatus according to claim 11, wherein the difference calculator calculates the difference value between a R (red) color channel image, a G (green) color channel image, and/or a B (blue) color channel image with respect to the color image and the gray conversion image.

13. The image forming apparatus according to claim 11, wherein the gray reviser revises the gray image by multiplying each of the respective difference values by different weight variables and then summing the weighted difference values.

14. The image forming apparatus according to claim 13, further comprises a user interface to interface with a user,
wherein the user interface comprises a display unit to display a setting window comprising a channel setting region.

15. The image forming apparatus according to claim 14, wherein the setting window further comprises a setting region to set a turning coefficient by a user, and
wherein the gray reviser corrects the converted gray image by multiplying the sum of the weighted difference values by the turning coefficient in order to retain a gray density.

16. The image forming apparatus according to claim 15, wherein the display unit displays the corrected gray image revised by the turning coefficient.

17. The image forming apparatus according to claim 11, wherein the gray converter converts the color image into the gray image based on a brightness value of a R color channel image of the color image.

18. The image forming apparatus according to claim 11, further comprising image outputting unit to output the corrected gray image.

* * * * *

UNITED STATES PATENT AND TRADEMARK OFFICE
CERTIFICATE OF CORRECTION

PATENT NO. : 8,422,081 B2  
APPLICATION NO. : 13/454497  
DATED : April 16, 2013  
INVENTOR(S) : In-ho Park et al.

Page 1 of 1

It is certified that error appears in the above-identified patent and that said Letters Patent is hereby corrected as shown below:

On Title Page 2, Col. 2, Item (56), (Other Publications), Line 4, Delete "retrieived" and insert --retrieved--, therefor.

In the Claims:

In Col. 9, Line 50, In Claim 8, delete "of a R" and insert --of an R--, therefor.

In Col. 10, Line 45 (Approx.), In Claim 17, delete "of a R" and insert --of an R--, therefor.

Signed and Sealed this
Eighth Day of October, 2013

Teresa Stanek Rea
*Deputy Director of the United States Patent and Trademark Office*